(12) United States Patent
Abraham et al.

(10) Patent No.: US 11,571,761 B2
(45) Date of Patent: Feb. 7, 2023

(54) THREAD RESTORATION TOOL (71) Applicant: Moshe Aharon Abraham, Shiloh (IL)

(72) Inventors: Moshe Aharon Abraham, Shiloh (IL); Zeev Stahl, Jerusalem (IL)

( * ) Notice: Subject to any disclaimer, the term of this patent is extended or adjusted under 35 U.S.C. 154(b) by 285 days.

(21) Appl. No.: 16/956,616

(22) PCT Filed: Mar. 11, 2019

(86) PCT No.: PCT/IL2019/050267
§ 371 (c)(1),
(2) Date: Jun. 22, 2020

(87) PCT Pub. No.: WO2019/186529
PCT Pub. Date: Oct. 3, 2019

(65) Prior Publication Data
US 2020/0398357 A1 Dec. 24, 2020

(30) Foreign Application Priority Data
Mar. 28, 2018 (IL) ............................... 258446

(51) Int. Cl.
*B23G 9/00* (2006.01)
*B23G 5/08* (2006.01)

(52) U.S. Cl.
CPC .............. *B23G 9/009* (2013.01); *B23G 5/083* (2013.01)

(58) Field of Classification Search
CPC .. B23G 5/083; B23G 9/009; Y10T 408/90473
See application file for complete search history.

(56) References Cited

U.S. PATENT DOCUMENTS

| 1,854,389 | A | * | 4/1932 | Arndt | B23D 21/08 30/102 |
| 3,618,961 | A | * | 11/1971 | Kiwalle | B23B 31/36 279/106 |
| 4,150,450 | A | * | 4/1979 | Laub, Jr. | B23G 9/009 470/134 |
| 5,060,330 | A | * | 10/1991 | Stahl | B23G 9/009 470/186 |
| 6,589,122 | B1 | * | 7/2003 | Chen | B23G 9/009 470/66 |

(Continued)

FOREIGN PATENT DOCUMENTS

DE 1207186 B * 12/1965
DE 9201294 U1 * 5/1992

*Primary Examiner* — Eric A. Gates
(74) *Attorney, Agent, or Firm* — Alphapatent Associates, Ltd; Daniel J. Swirsky (57) ABSTRACT A thread restoration tool (10), including: a first (30A) and second (30B) jaw, being horizontally rotatable (72B) one in relation to the other, for gripping the thread (22) in between; at least one knife (20A, 20B), extending from at least one of the first (30A) and second (30B) jaws, for being inserted into the thread (22) by the gripping; a vertical to horizontal convertor (208), for converting vertical motion of a vertically positioned rod (36) to the horizontal rotating of one of the jaws (30A, 30B) in relation to the other, thereby the gripping of the thread (22) is operable via the top (44A) of the rod (36) being disposed above the thread (22), thereby reducing occupied space (220) around the thread (22), required for the gripping.

7 Claims, 6 Drawing Sheets

(56) References Cited

U.S. PATENT DOCUMENTS

| 7,625,291 | B2 * | 12/2009 | Abraham | B23G 9/00 |
| | | | | 470/67 |
| 7,887,424 | B2 * | 2/2011 | Abraham | B23G 9/009 |
| | | | | 470/190 |
| 2004/0132534 | A1 * | 7/2004 | Chen | B23G 9/009 |
| | | | | 470/183 |

* cited by examiner

THREAD RESTORATION TOOL

CROSS-REFERENCE TO RELATED APPLICATIONS

This application is a U.S. National Phase Application under 35 U.S.C. 371 of International Application No. PCT/IL2019/050267, which has an international filing date of Mar. 11, 2019, and which claims priority and benefit from Israel Patent Application No. 258,446, filed Mar. 28, 2018, which is incorporated herein by reference in its entirety.

TECHNICAL FIELD

The present invention relates to a universal thread restoration tool. More particularly to a universal thread restoration tool for repairing damaged threads of male threaded members, such as pipes, studs, and screws, which are permanently fitted adjacent to each other or in a tight space.

BACKGROUND

In many instances threaded studs which are difficult to disassemble are damaged by rust or mechanical impact. It is desirable to rework the damaged threads of such a stud with the stud in situ, meaning, while it is installed in its original position in an engine, mechanical structure, concrete beam, or any other device. Additionally, it is often required to repair the thread in a limited space because of disturbing projected surrounding objects such as adjacent studs.

Several methods are known to rework a damaged threaded stud in situ. Common one is the use of a standard threading die in the form of a ring or nut having a central opening for receipt of the stud member. One problem with this conventional type die is that it must be installed on the free end of the stud and worked inwardly. Frequently, the thread damage to that stud has occurred on or near the free end. Thus, the free end of the stud must be cut away and/or hand worked with a file or other simple tool to permit the die nut to be started on the free end of the stud.

Another way for repairing such damaged thread is described in U.S. Pat. No. 3,956,787 to Crumpacker, U.S. Pat. No. 4,201,503 to Nannen, U.S. Pat. No. 4,346,491 to Kraus, et al., U.S. Pat. No. 4,572,032 to Kinzler, U.S. Pat. No. 4,968,190 to Sibole, U.S. Pat. No. 5,288,181 to Pinkston, U.S. Pat. No. 5,803,676 to Wienss and U.S. Pat. No. 6,206,620 to Burns. All utilizing split die set which can be mounted around a stud on a sound area beyond the damaged end. The two pieces of the split die are engaged together by various methods to form a complete die which is tightened around the stud and rotated outwardly. The problem with these solutions is that they are not universal, meaning that for any thread diameter and pitch a specific die is needed, accordingly it becomes very expensive to cover all different thread sizes and pitches, and require skill and tools for identifying the thread.

Other common rethreading tools are hand held triangular files, which are difficult and tedious in use, imprecise in their results and not applicable for in situ usage at limited spaces.

Universal rethreading tools which adapt to a range of thread diameters and pitches are also known, some are described for example in U.S. Pat. No. 1,857,493 to Campaigne, U.S. Pat. No. 2,388,790 to Mackliet, U.S. Pat. No. 5,224,900 to Hai, and U.S. Pat. Nos. 5,060,330, 7,625,291, 7,887,424 to the Applicant.

Figure 1:
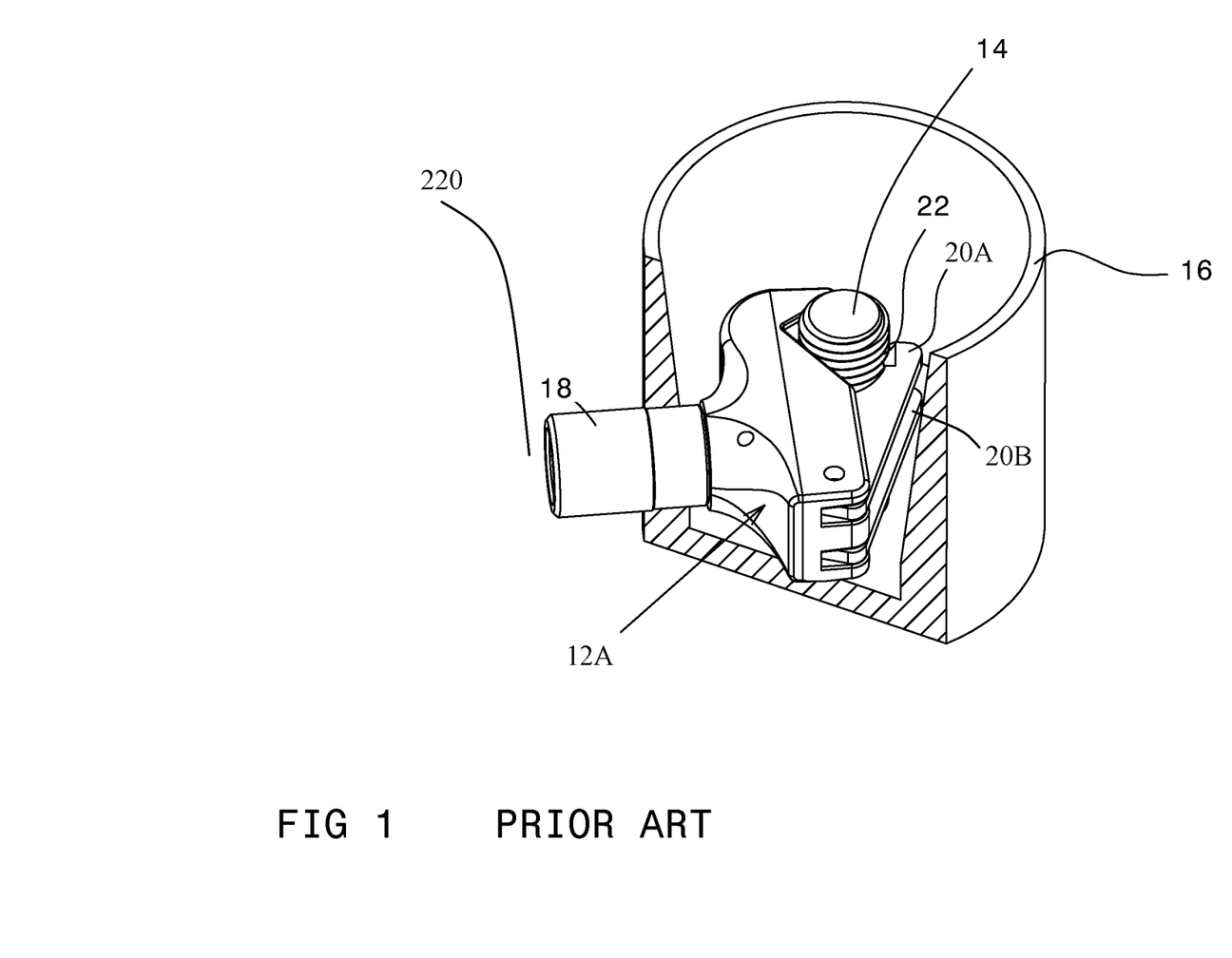
FIG. 1 depicts a prior art thread restoration tool.

FIG. 1 depicts a prior art thread restoration tool. A prior art grip 12A including knives 20A and 20B, is closed by rotating a handle 18, for moving, via handle 18, knives 20 within the thread 22.

However, the above mentioned prior art, require considerably large free space 220 around the stud to properly operate the tool, which is not available in many cases due to a barrier 16.

Consequently, none of the prior art devices as described above, is satisfactorily operative in reworking a damaged stud thread in situ, particularly in tight space locations. Moreover, none of them provide a simple universal tool, which can be easily manufactured, and which can be installed on a sound area beyond the damaged end of the thread, no matter of its diameter or pitch, even in a tight restricted space, and worked outwardly to repair the damaged thread.

Accordingly, there is a need to remedy this situation by providing an adjustable universal tool for the repairing of damaged stud threads, which occupies small cylindrical space around the stud axis, in order to rotate about the stud axis and fix the damaged thread.

SUMMARY

A thread restoration tool, including:
a first and second jaw; and
a vertical to horizontal convertor, for converting vertical motion to gripping of the thread.
thereby reducing space around the thread, occupied by the tool.

BRIEF DESCRIPTION OF THE DRAWINGS

Embodiments, features, and aspects of the invention are described herein in conjunction with the following drawings.

DETAILED DESCRIPTION

Figure 2:
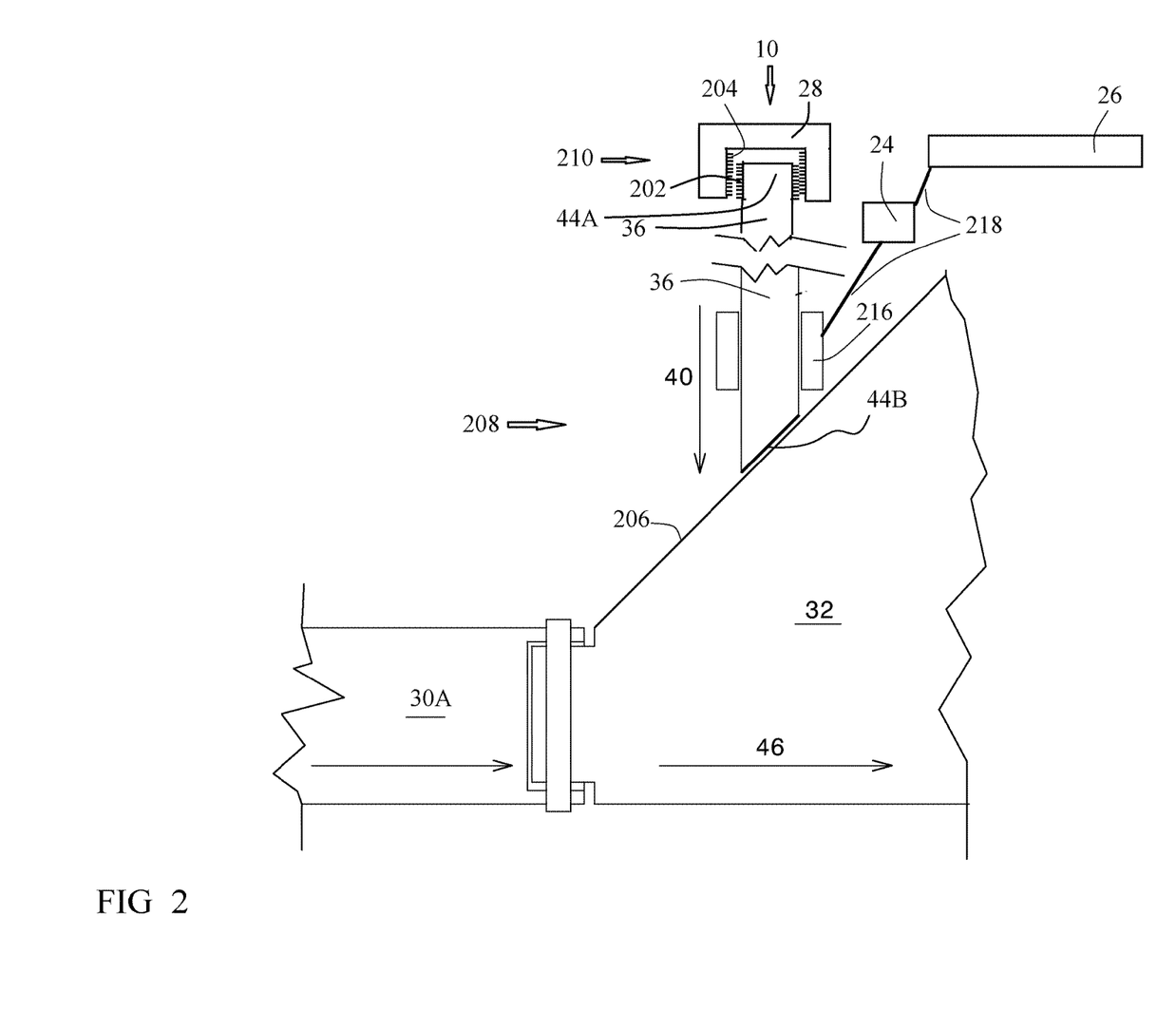
FIG. 2 is a front schematic sectional view of the thread restoration tool according to one embodiment of the invention.

FIG. 2 is a front schematic sectional view of the thread restoration tool according to one embodiment of the invention.

A thread restoration tool 10 includes a rotatable handle 28 having a thread 202; and a rod 36 having a thread 204, being complementary to thread 202.

The terms "horizontal", "vertical", "lift", etc. assume herein restoring a screw disposed vertically.

Thus, thread restoration tool 10 includes a rotational to vertical convertor 210, in which rotation of handle 28 lifts and lowers rod 36 in relation to a shaft 216 thereof, being fixed to the body 24.

The bottom surface 44B of rod 36 is tilted, and touches a top tilted surface 206 of a ringed plate 32. Vertical pressure 40 of bottom 44B of rod 36 on top surface 206 of ringed plate 32 converts the vertical motion to horizontal motion 46 of top surface 206 of ringed plate 32.

Figure 3:
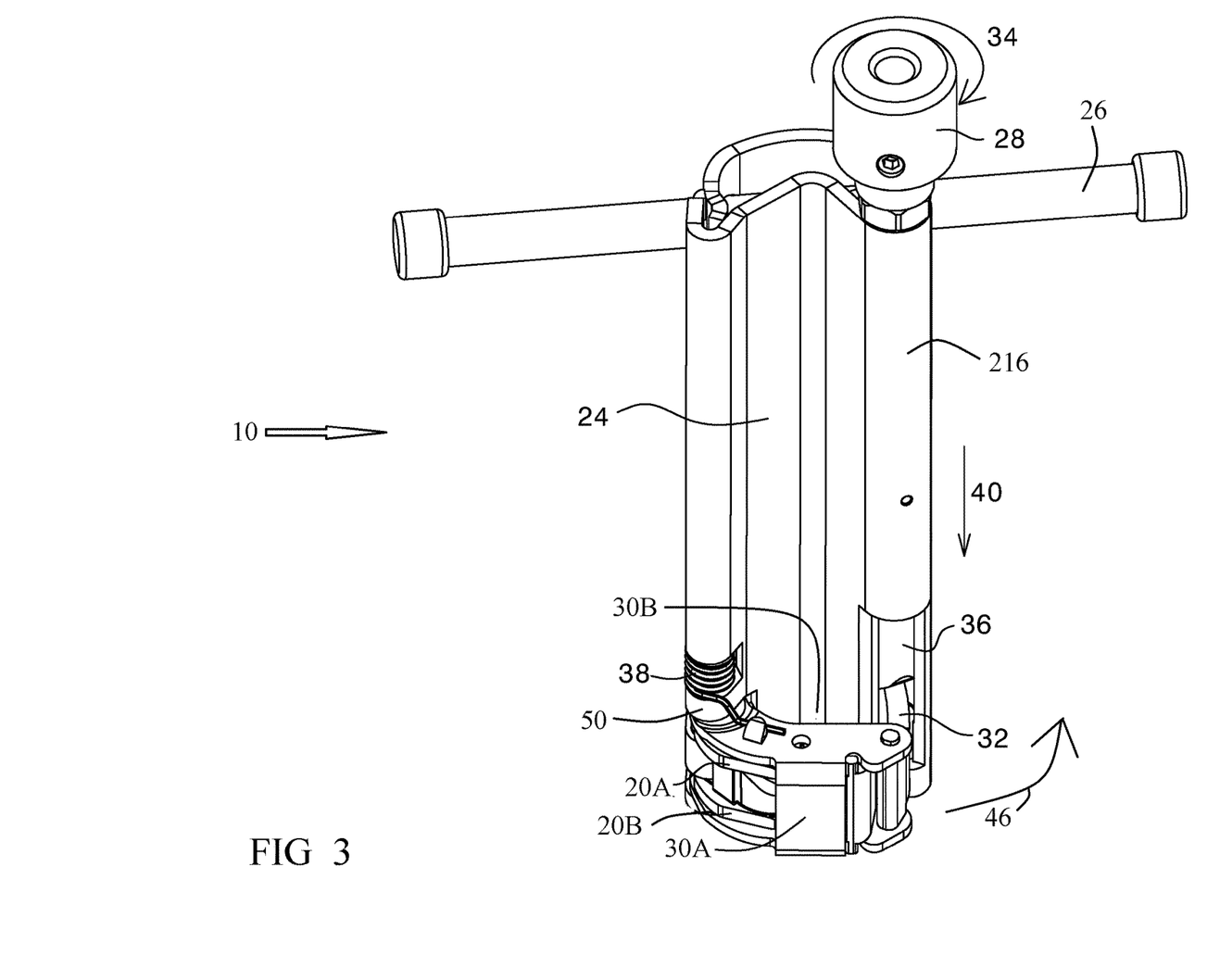
FIG. 3 is a top front perspective view of the thread restoration tool of FIG. 2.

FIG. 3 is a top front perspective view of the thread restoration tool of FIG. 2.

Ringed plate 32 extends from a jaw 30A.

Figure 4:
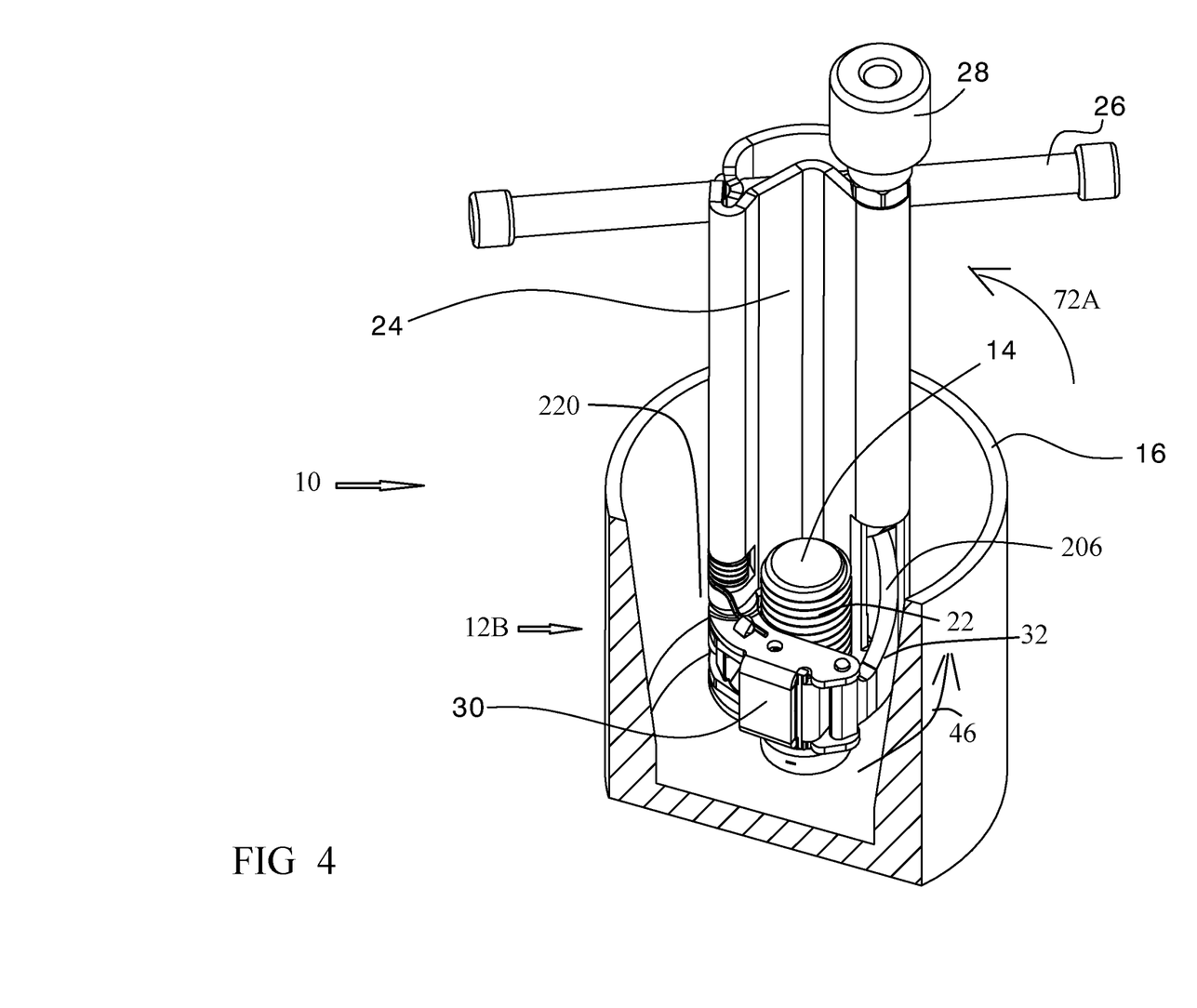
FIG. 4 is the top front perspective view of FIG. 3, housing a screw.

FIG. 4 is the top front perspective view of FIG. 3, housing a screw.

Thread restoration tool 10 constitutes a gripper 12B, in which the horizontal motion 46 of jaw 30A grips a thread 22 of a screw 14 onto a jaw 30B, being a part of body 24.

Figure 5:
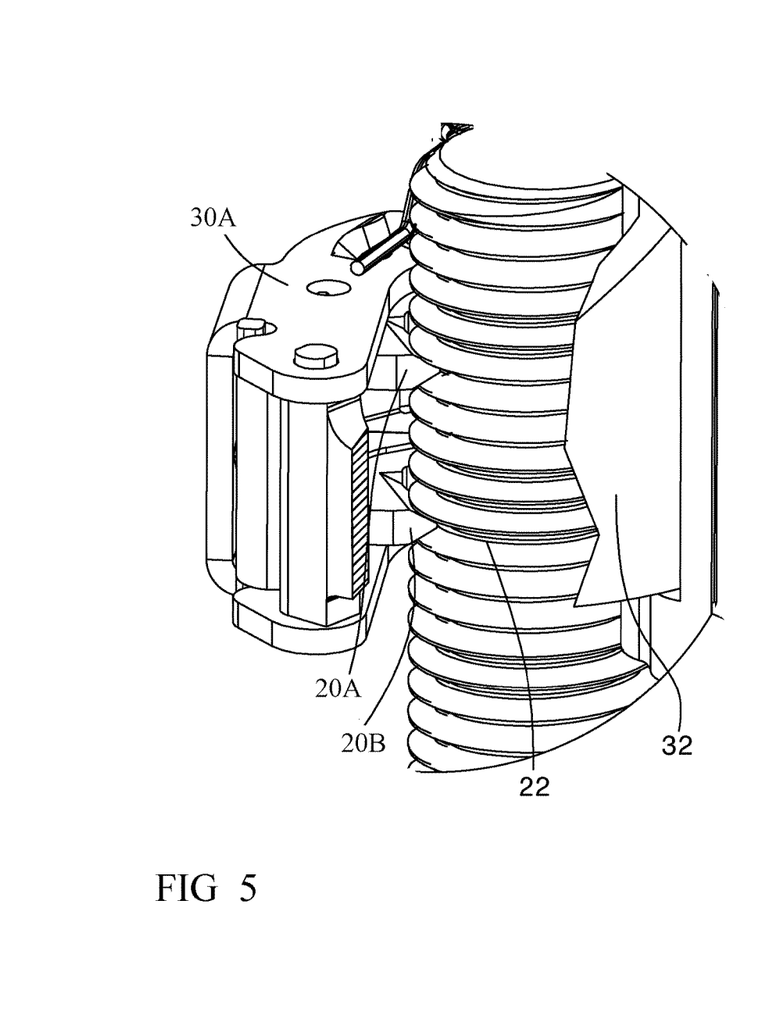
FIG. 5 is a magnification cut view of a portion of FIG. 4.

FIG. 5 is a magnification cut view of a portion of FIG. 4.

Knives 20A and 20B both extend from jaw 30A, thus the embracing of jaw 30A inserts knives 20A and 20B into the thread 22 of screw 14.

Referring again to FIG. 4, the user then rotates body 24 via a lever 26, as shown by arrow 72A, for rotating knives 20A and 20B within and around thread 22.

Figure 6:
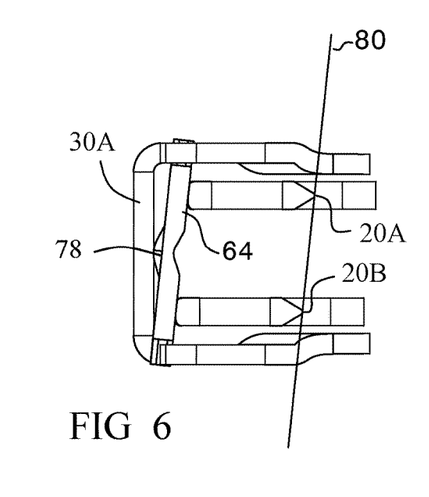
FIG. 6 is a schematic view of the knives of FIG. 5 at a first position.

FIG. 6 is a schematic view of the knives of FIG. 5 at a first position.

Figure 7:
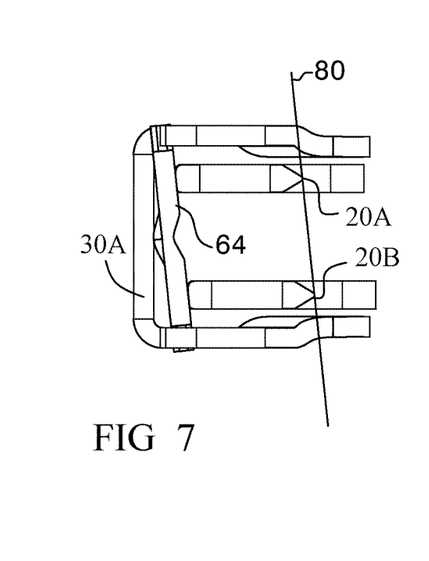
FIG. 7 is a schematic view of the knives of FIG. 5 at a second position.

FIG. 7 is a schematic view of the knives of FIG. 5 at a second position.

Knives 20A and 20B both extend from jaw 30A, through a rocking support 64, being rotatable about a dome 78, for allow to rock support 64, for increasing the extension of knife 20A in relation to that of knife 20B, as depicted in FIG. 6, or for increasing the extension of knife 20B in relation to that of knife 20A, as depicted in FIG. 6.

The rocking provides distributing the forces, for balancing thereof, for compensating over deviations from the ideal shape of the thread, by processing the thread in a non-parallel manner.

Figure 8:
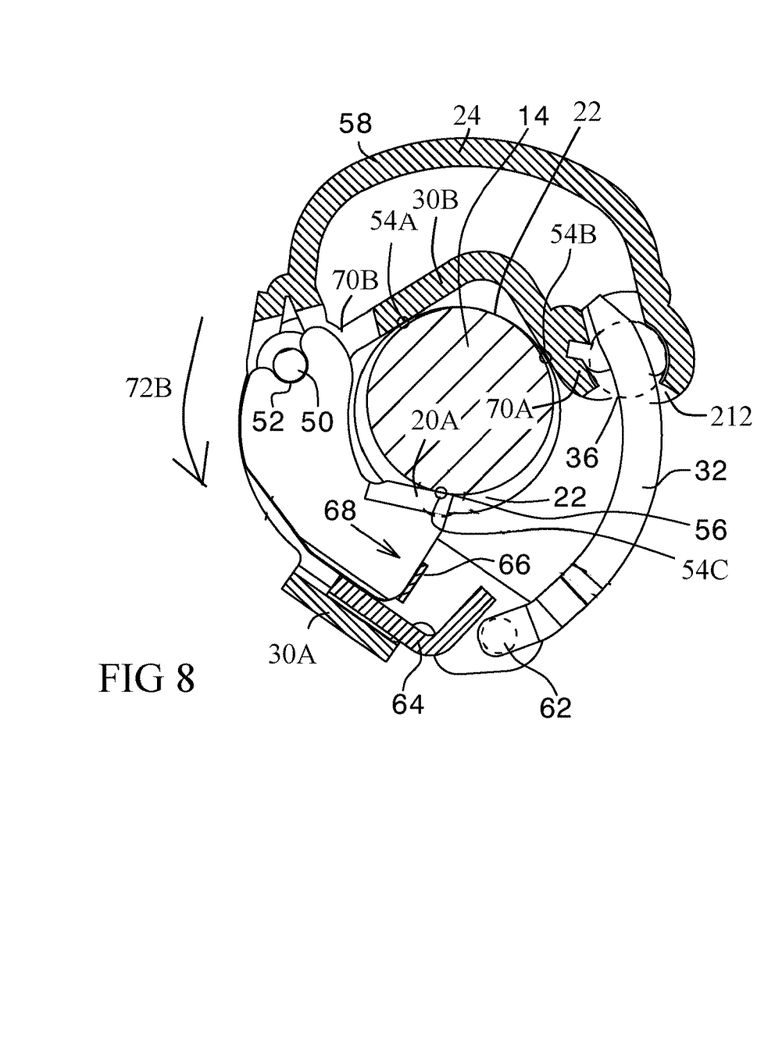
FIG. 8 is a top sectional view of FIG. 3, housing a large screw.

FIG. 8 is a top sectional view of FIG. 3, housing a large screw.

At a certain height of thread 22 of screw 14, thread 22 is gripped by three gripping points, namely points 54A and 54B of a jaw 30B, being a part of body 24; and by point 54C of knife 20A, extending from jaw 30A.

Figure 9:
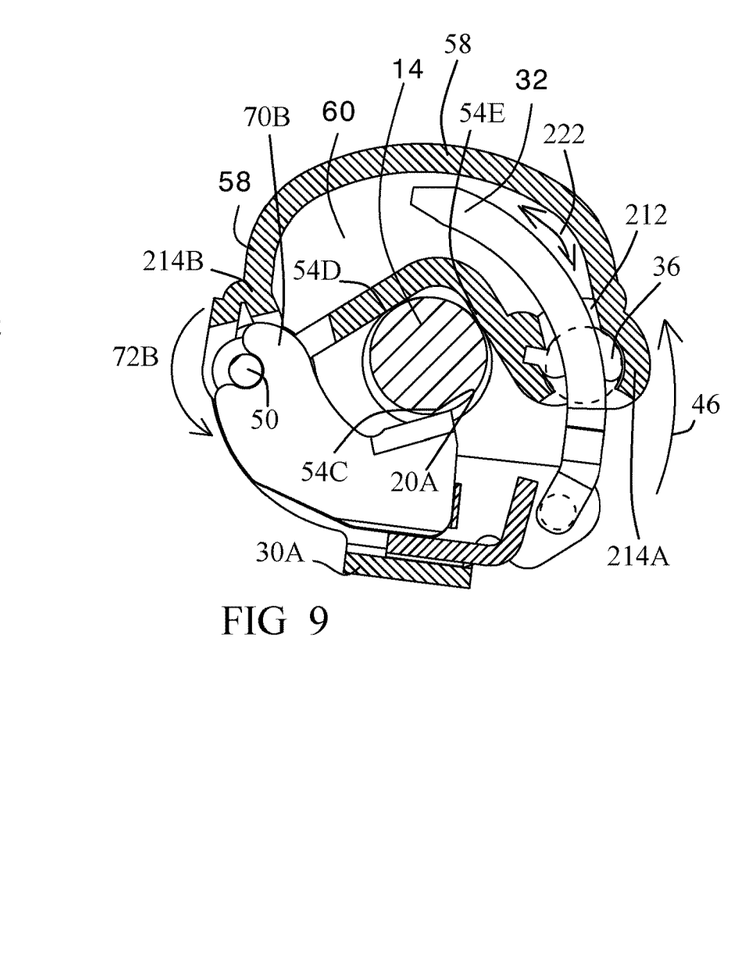
FIG. 9 is a top sectional view of FIG. 3, housing a small screw.

FIG. 9 is a top sectional view of FIG. 3, housing a small screw.

Jaw 30A is rotatable about a hinge 50, as shown by arrow 72B, for making knife 20A grip a smaller screw 14.

Thread 22 of smaller screw 14 is gripped by points 54C and 54D of body 24 and by point 54C of knife 20A.

Ringed plate 32 is shaped ringed for being disposed under rod 36 at any rotational position of jaw 30A about hinge 50.

Numeral 10 denotes the thread restoration tool according to one embodiment of the invention;

numeral 12A denotes a grip of a prior art thread restoration tool;

numeral 12B denotes a grip of thread restoration tool 10;

numeral 14 denotes a screw;

numeral 16 denotes an external barrier;

numeral 18 denotes a prior art handle of a prior art thread restoration tool;

numeral 20A and 20B denotes top and bottom knives, for being inserted into the thread, for restoring the thread;

numeral 22 denotes a thread of the screw to be restored;

numeral 24 denotes the body/chassis, in relation to which the other elements are moveable;

numeral 26 denotes a lever, for rotating body 24;

numeral 28 denotes the handle, disposed at the top of thread restoration tool 10, for applying the gripping of the thread of the screw, by lowering rod 36;

numeral 30A denotes the jaw being movable in relation to body 24;

numeral 30B denotes the jaw being rigidly fixed to body 24;

numeral 34 denotes rotational motion;

numeral 36 denotes the vertically moving rod, for horizontally moving jaw 30A;

numeral 32 denotes the plate, extending from jaw 30A, for rotating it in relation to jaw 30B;

numeral 38 denotes a spring, for retracting jaw 30A, for cancelling the gripping, upon lifting rod 36, by handle 28;

numeral 40 denotes vertical pressure;

numerals 44A and 44B denote the top and bottom respectively, of rod 36;

numeral 46 denotes horizontal motion of plate 32 and of jaw 30A applying the gripping of thread 22 of screw 14;

numeral 50 denotes a hinge between jaws 30A and 30B;

numeral 52 denotes a slit, for assembling knife 20A;

numerals 54A, 54B, 54C, 54D and 54E denote gripping points of the jaws on thread 22 of screw 14;

numeral 56 denotes the edge of the knife;

numeral 58 denotes an arm, being rigidly fixed to body 24 and extending therefrom, for forming aperture 212; arm 58 is shaped ringed for allowing ringed plate 32 travel parallel thereto;

numeral 60 denotes the ringed channel;

numeral 62 denotes a pin, for connecting plate 32 to jaw 30A;

numeral 64 denotes a support, for knives 20A and 20B;

numeral 66 denotes a leaf spring, for holding knife 20A;

numeral 72A denotes rotation of body 24;

numeral 78 denotes a dome;

numeral 80 is an imaginary tilted line for showing different positions of knives 20A and 20B, one in relation to the other;

numeral 202 denotes the thread of handle 28;

numeral 204 denotes the thread of rod 36;

numeral 206 denotes the top tilted surface of plate 32;

numeral 210 denotes a rotational to vertical convertor;

numeral 212 denotes the aperture for guiding the horizontal motion of plate 32;

numerals 70A and 70B denote ends of jaw 30B;

numeral 72A denotes rotation of body 24 in relation to screw 14;

numeral 72B denotes rotation of jaws 30A and 30B one in relation to the other;

numerals 214A and 214B denote ends of arm 58;

numeral 216 denotes the shaft, for sliding rod 36 there along;

numerals 218 denotes rigid fixing to body 24;

numeral 220 denotes space around the thread, occupied by the tool; the space must not exceed an external barrier 16;

numeral 222 denotes parallelism of plate 32 in relation to a portion of arm 58, forming a ringed channel 60, for allowing ringed plate 32 horizontally travel therewithin;

numerals 214A and 214B denote ends of arm 58;

The reference numbers in the claims should not be interpreted as limiting the claims in any form.

What is claimed is:

1. A thread restoration tool (10), comprising:
   a first (30A) and a second (30B) jaw, being horizontally rotatable (72B) one in relation to the other, for gripping said thread (22) in between;
   at least one knife (20A, 20B), extending from at least one of said first (30A) and second (30B) jaws, for being inserted into said thread (22) by said gripping;
   a vertical to horizontal convertor (208), for converting vertical motion of a vertically positioned rod (36) to said horizontal rotating of one of said jaws (30A, 30B) in relation to the other,
   thereby said gripping of said thread (22) is operable via a top (44A) of said rod (36) being disposed above said thread (22),
   thereby reducing space (220) around said thread (22), occupied by said thread restoration tool (10),
   wherein said vertical to horizontal convertor (208) comprises:
   a top tilted surface (206) of a plate (32) extending from said first jaw (30A); and
   a bottom tilted surface (44B) of said rod (36), for vertically pressing said top tilted surface (206) of said plate (32),
   thereby horizontally moving (46) said plate (32) and said first jaw (30A).

2. A thread restoration tool (10) according to claim 1, wherein said plate (32) extending from said first jaw (30A) is shaped ringed, for being disposed under said rod (36) along said horizontal motion (46) of said plate (32),
   thereby increasing a diameter range of said gripping, for gripping various diameters of said thread (22).

3. A thread restoration tool (10) according to claim 1, wherein said vertical to horizontal convertor (208) further comprises:
   an aperture (212), for guiding said horizontal moving (46) of said plate (32) therewithin,
   thereby providing that said top tilted surface (206) of said plate (32) is disposed under said rod (36) along said horizontal moving (46) of said plate (32),
   thereby increasing a diameter range of said gripping, for gripping various diameters of said thread (22).

4. A thread restoration tool (10) according to claim 3, wherein said aperture (212) comprises:
   a first end (70A) of said second jaw (30B); and
   a first end (214A) of an arm (58), a second end (214B) thereof being fixed to a second end (70B) of said second jaw (30B) and extending therefrom.

5. A thread restoration tool (10) according to claim 4, wherein said second jaw (30B) and said arm (58) form together a channel (60), being shaped to house said plate (32) along said horizontal moving (46) thereof.

6. A thread restoration tool (10) according to claim 1, further comprising:
   a rotational to vertical convertor (210), for converting rotational motion (34) of a handle (28), disposed on said rod (36), to said vertical motion (40) of said rod (36).

7. A thread restoration tool (10) according to claim 1, further comprising:
   a body (24), being rigidly fixed to one of said first (30A) and second (30B) jaws, said body (24) extending upwards, for rotating (72A) said one of said first (30A) and second (30B) jaws therefrom in relation to said thread (22),
   thereby reducing said space (220) occupied by said tool (10).

* * * * *